United States Patent
Friel et al.

(10) Patent No.: US 6,697,897 B1
(45) Date of Patent: Feb. 24, 2004

(54) DATA COMMUNICATION INTERFACE BETWEEN HOST AND SLAVE PROCESSORS

(75) Inventors: Daniel D. Friel, Woburn, MA (US); Gary V. Zanders, Fairview, TX (US)

(73) Assignee: Microchip Technology Incorporated, Chandler, AZ (US)

( * ) Notice: Subject to any disclaimer, the term of this patent is extended or adjusted under 35 U.S.C. 154(b) by 430 days.

(21) Appl. No.: 09/698,891

(22) Filed: Oct. 27, 2000

Related U.S. Application Data

(60) Provisional application No. 60/161,940, filed on Oct. 28, 1999.

(51) Int. Cl.[7] ............................................. G06F 13/42
(52) U.S. Cl. ....................................... 710/105; 709/209
(58) Field of Search ............................... 710/105, 110; 709/209

(56) References Cited

U.S. PATENT DOCUMENTS

| | | | |
|---|---|---|---|
| 4,689,740 A | 8/1987 | Moelands et al. | 364/200 |
| 5,023,778 A | 6/1991 | Simon, Jr. et al. | |
| 5,396,639 A | 3/1995 | Suenaga et al. | 395/800 |
| 5,809,257 A | 9/1998 | Shibazaki | 395/287 |
| 5,864,872 A | 1/1999 | Lee et al. | 711/115 |

OTHER PUBLICATIONS

PCT Written Opinion, International Preliminary Examining Authority, Nov. 9, 2001, 5pp.
Overlaur, Michael J., Battery Management Alternatives for Wireless Products, www.dalsemi.com, Dallas Semiconductor.
Overlaur, Michael J., Power 2000: Battery Management Alternatives for Wireless Products, www.dalsemi.com, Dallas Semiconductor.
Overlaur, Michael J., Battery Management Product Overview , www.dalsemi.com, Dallas Semiconductor.
About the 12C–bus, wwww.semiconductors.philips.com/i2c/facts/, Philips Semiconductors.
The 12C–Bus Specification Version 2.1, 1–46, Jan. 2000, Philips Semiconductors.

*Primary Examiner*—Paul R. Myers
(74) *Attorney, Agent, or Firm*—Baker Botts L.L.P.

(57) ABSTRACT

A data communication interface for transferring at least one data bit to a host processor. The interface includes a one-wire data line, and a slave processor connected to the data line and including a pull-down circuit for varying voltage on the data line. The slave processor is passive and incapable of sampling data from the data line. The slave processor is programmed to vary voltage on the data line when the data line is energized, to signal at least one data bit.

19 Claims, 3 Drawing Sheets

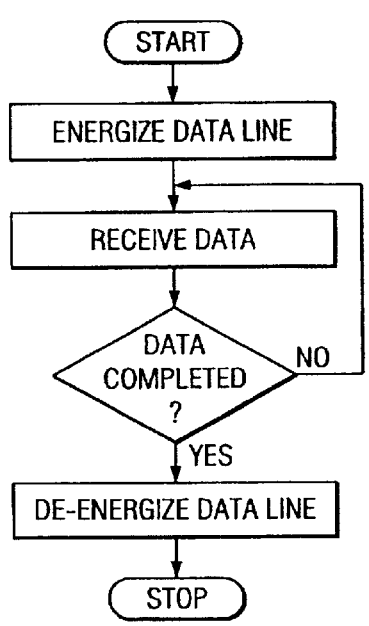
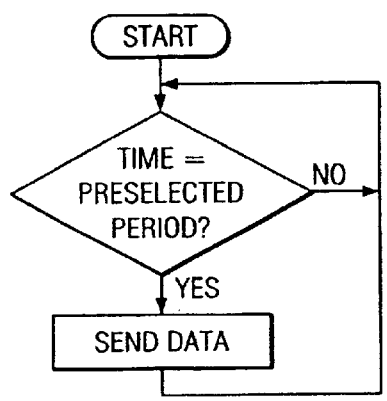
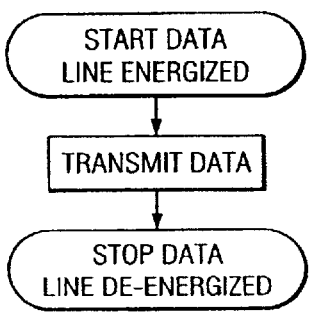
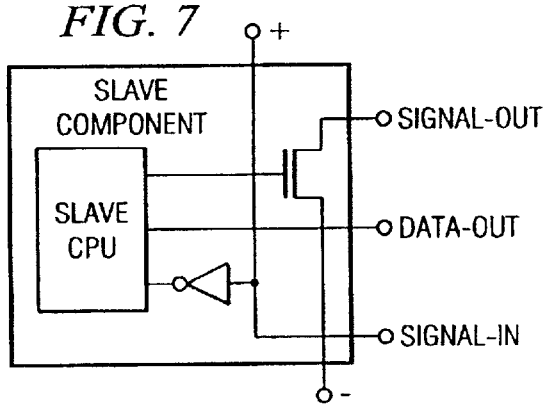
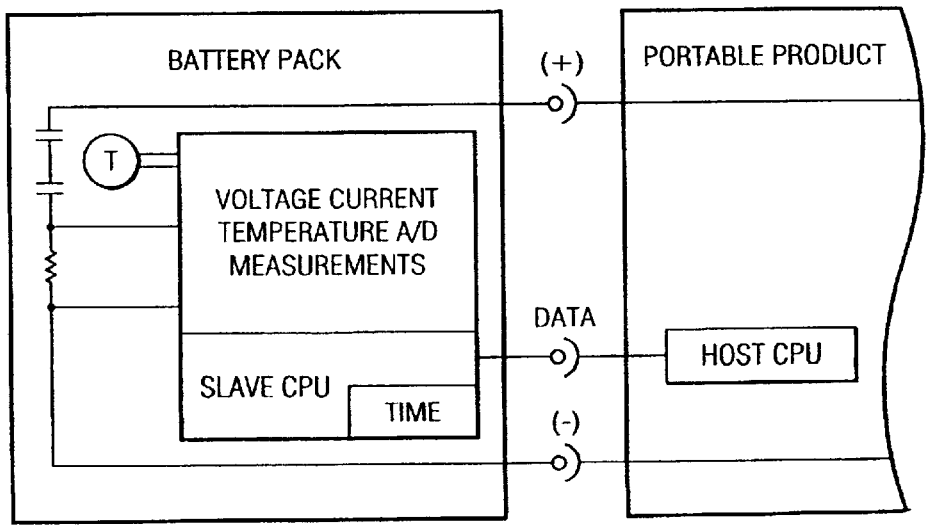

DATA COMMUNICATION INTERFACE BETWEEN HOST AND SLAVE PROCESSORS

CROSS-REFERENCE OF RELATED APPLICATIONS

The present application claims priority to provisional U.S. patent application Ser. No. 60/161,940, filed Oct. 28, 1999, which is assigned to the assignee of the present disclosure and incorporated herein by reference.

BACKGROUND OF DISCLOSURE

1. Field of Disclosure

The present disclosure relates to a device for the transmission of signals between two data processors. More particularly, the disclosure relates to a device for the exchange of data between a host processor and a slave processor. A connection between the two processors is provided by a single data line, and communications are conducted in one direction, from the slave processor to the host processor.

2. Related Art

For portable electronic devices, like cell phones, personal digital assistants, and camcorders, for example, architectures/protocols have been developed for connecting various components of the portable electronics together so that they can communicate. A simple example is a battery pack (a "slave" component) that is removably connectable to a portable electronic device (a "host" device). At the very least, the battery pack should be able to communicate with the portable electronic device to inform the camcorder of the amount of energy contained in the battery.

Preferably, the communication architecture is designed with as few connections as possible. Currently, one of the most used architectures is the system management (SM) bus, which includes three wires to interconnect host devises and slave components. The devices and components communicate over one of the wires, while a clocking signal is provided over the second wire, and the third wire is used as a ground.

A currently popular protocol for use over the SM bus is the Inter-Integrated Circuit ($I^2C$), which was originally developed by Philips Semiconductor. The protocol utilizes a synchronous signal and has the advantage of accommodating multiple master and multiple slave components (including multiple batteries, wherein the system monitors various aspects of the condition of each battery).

For cell phone manufacturers, however, there has been an emphasis on using a communication architecture including only two wires. An architecture/protocol that has been adopted by most cellular phone companies is the "DQ" system developed by Dallas Semiconductor, Benchmarq, Unitrode, and Texas Instrument. The DQ system uses a single wire and a ground wire to connect a host device to multiple slave components. Data is transmitted in two directions on the one non-ground wire. The architecture includes a pull up resistor that maintains the line in a high state, and allows data to be transmitted by pulling the line down, so that the state of the line is up or down for each transmitted bit.

One drawback of the bi-directional, one-wire bus is, that with multiple slave components connected to one master device, handshaking becomes complicated, and the host device must interrogate each slave component separately.

Another drawback of the bi-directional, one-wire bus is that some use of time-domain or frequency-domain relations, to track the two half-channels of communication is required. In an effort to minimize the expense of the system, a crude time base is provided by using an unstable oscillator. This crude time base, together with electrical relationships, provides the necessary reference for two-way communication over a one-wire bus.

A further drawback of the bi-directional, one-wire bus is that, because of the bi-directional nature of the communications, the slave component must require the ability to sample the data line and receive messages from the host. A slave component of an $I^2C$ system, therefore, will in most cases require the architecture necessary to allow the slave to receive messages, thereby increasing the cost and complexity of the slave.

What is still desired, accordingly, is a new and improved communications architecture/protocol for connecting a processor of slave component to a processor of a host component. Preferably, the new architecture/protocol will be simple and inexpensive in comparison to the above describe $I^2C$ and DQ systems.

SUMMARY OF DISCLOSURE

In response, the present disclosure provides a data communication interface for transferring at least one data bit to a host processor. The interface includes a one-wire data line, and a slave processor connected to the data line and including a pull-down circuit for varying voltage on the data line. The slave processor is incapable of sampling data from the data line, but is programmed to vary voltage on the data line using the pull-down circuit when the data line is energized, to signal at least one data bit.

According to one aspect of the present disclosure, the slave processor is programmed to pull the voltage low on the energized data line to signal a "0" and to raise the voltage high on the energized data line to signal a "1".

According to another aspect of the present disclosure, the interface includes a host processor connected to the data line and including a pull-down circuit for varying voltage on the data line at the request of the host processor. The host processor is capable of sampling data from the data line, and is programmed to energize the data line using the pull-down circuit when at least one data bit is desired from the slave processor. The host processor is also programmed to sample the voltage on the energized data line to determine the value of a bit signaled by the slave processor.

As described in greater detail below, the presently disclosed communications architecture/protocol uses a minimum amount of hardware to communicate pre-selected information from the slave to the host. The communication format is simple and does not require continuous monitoring, resulting in a reduction of power consumption for both the host and the slave, which is of course important in portable electronic devices. The presently disclosed one-way, single wire communication interface, accordingly, is particularly attractive for hand-held or other low-power portable electronic devices, such as cell phones, personal digital assistants and camcorders, for example.

BRIEF DESCRIPTION OF DRAWINGS

The present disclosure is described with reference to the accompanying drawings, wherein:

FIG. 3 shows a flow chart illustrating a "data initiation" algorithm according to the present disclosure for use by the host device of FIG. 1;

FIG. 4 shows a flow chart illustrating a "send data" algorithm according to the present disclosure for use by the slave component of FIG. 1;

FIG. 5 shows a flow chart illustrating a "send data" algorithm according to the present disclosure for use by the guest device of FIG. 1;

FIG. 6 is a simplified schematic illustrating a communications interface according to the present disclosure, including a unidirectional, one-wire bus connecting a slave component comprising a battery pack to a host device comprising a portable electronic product;

FIG. 7 is a simplified schematic illustrating a computer processing unit according to the present disclosure adapted to be connected in series with other, similar computer processing units for sequential communications with a host device.

Like reference characters designate identical or corresponding components and units throughout the several views.

DETAILED DESCRIPTION OF DISCLOSURE

Referring to FIGS. 1 through 4, the present disclosure provides a method of signaling at least one data bit to a host processor from a slave processor over a one-wire data line. The method includes providing a slave processor that is incapable of sampling data from the data line. The method also includes energizing the data line using a host processor when at least one data bit is desired from the slave processor, varying the voltage on the energized data line using the slave processor, and sampling the voltage on the energized data line using the host processor to determine the value of a bit signaled by the slave processor.

When the desired data bit is signaled by the slave processor, the host processor de-energizes the data line. Preferably, the slave processor doesn't start varying the voltage on the energized data line to signal the data bit, until a pre-selected time period after the line is energized by the host so that the host is prepared to receive the entire data signal.

Figure 2:
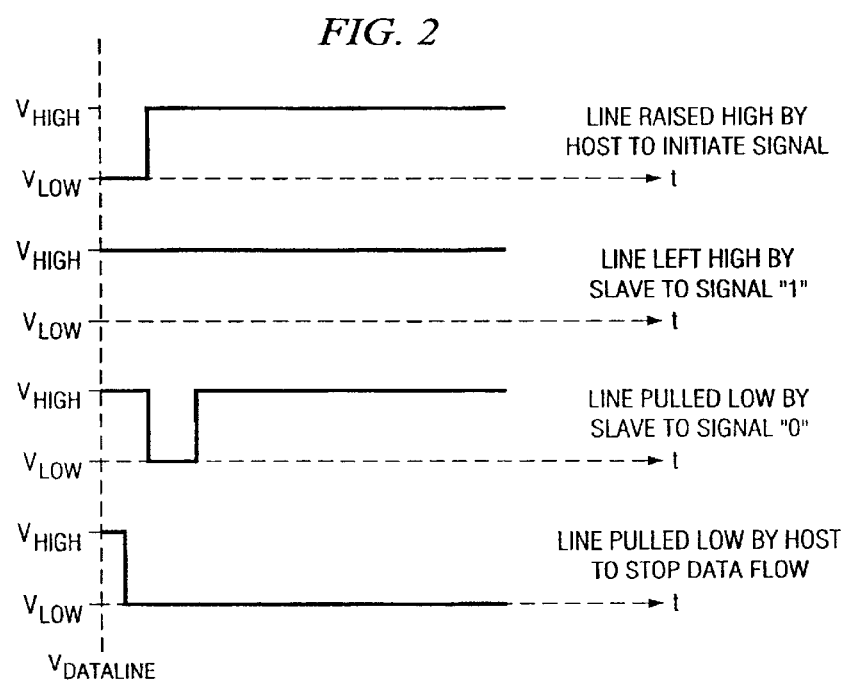
FIG. 2 shows graphs of data line voltage versus time, illustrating unidirectional communication according to the present disclosure for use with the interface of FIG. 1.

As shown best in FIG. 2, the host processor energizes the data line by raising the data line to a high logic level. Then, the slave processor pulls the voltage low on the energized data line to signal a "0", and raises the voltage high on the energized data line to signal a "1". The method of communication is preferably designed to minimize the charge transfer out of the battery in the module. Thus, the slave processor never sources current to the data line, but only sinks current.

Figure 1:
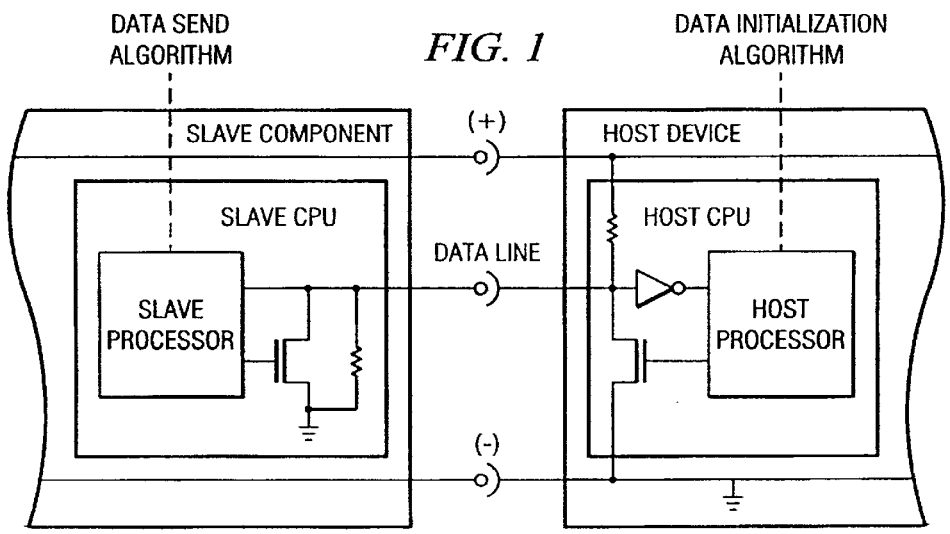
FIG. 1 is a simplified schematic illustrating a communications interface according to the present disclosure, including a slave component connected to a host device through a unidirectional, one-wire bus.

As shown in FIG. 1, a host device having a computer processing unit (CPU) includes the host processor. The CPU also includes a pull-down transistor controlled by the host processor for varying the voltage on the data line. A slave component has a CPU including the slave processor and also including a very high-impedance pull-down resistor for varying the voltage on the data line. (A very high-impedance pull-down resistor is used in the slave component merely to avoid the risk of floating nodes.) As shown, the system also includes a power line and a ground line extending between the device and the component. All of the lines are connectably split between the slave component and the host component such that the lines can be re-connected when desired, whereby the slave can be plugged into the host (e.g., like a battery pack being plugged into a cell phone).

FIG. 3 shows a "data initiation" algorithm according to the present disclosure for use by the host processor of FIG. 1, while FIG. 4 shows a "send data" algorithm according to the present disclosure for use by the slave processor of FIG. 1. With the "send data" algorithm of FIG. 4, the slave processor doesn't act until it is woken by the host processor when the host processor energizes the data line.

FIG. 5 shows an alternative "send data" algorithm according to the present disclosure for use by the guest device of FIG. 1. Using the alternative algorithm, the slave processor simply attempts to signal data at pre-selected intervals, even if the data line has not been energized by the host.

In FIG. 6, a slave component comprising a battery pack is shown that includes the slave CPU of FIG. 1. In addition to the slave CPU, the battery pack includes a battery, at least one measurement device for measuring a variable property of the battery and for producing an analog signal indicative of the measurement, and an analog to digital converter for converting the analog signal indicative of the measurement to at least one data bit. The slave CPU is connected to the converter and includes memory (not shown) for receiving the at least one data bit from the converter and storing the at least one data bit until the data line is energized.

As shown in FIG. 6, the at least one measurement device of the battery pack comprises means for measuring the voltage level, the current, the temperature, and the current usage. As also shown, the battery pack is connectable to a portable product (e.g., a cell phone) including the host CPU of FIG. 1.

Referring to FIG. 7, another slave CPU including a signal-in line, a data-out line, and a signal-out line. The slave CPU also includes a processor including a pull-down circuit for varying voltage on the signal-out line. The processor is connected to the signal-in line and the data-out line and is programmed to transfer at least one data bit over the data-out line when the voltage of the signal-in line is varied. The processor is also programmed to vary the voltage on the signal-out line when completed transferring the at least one data bit over the data line.

Figure 8:
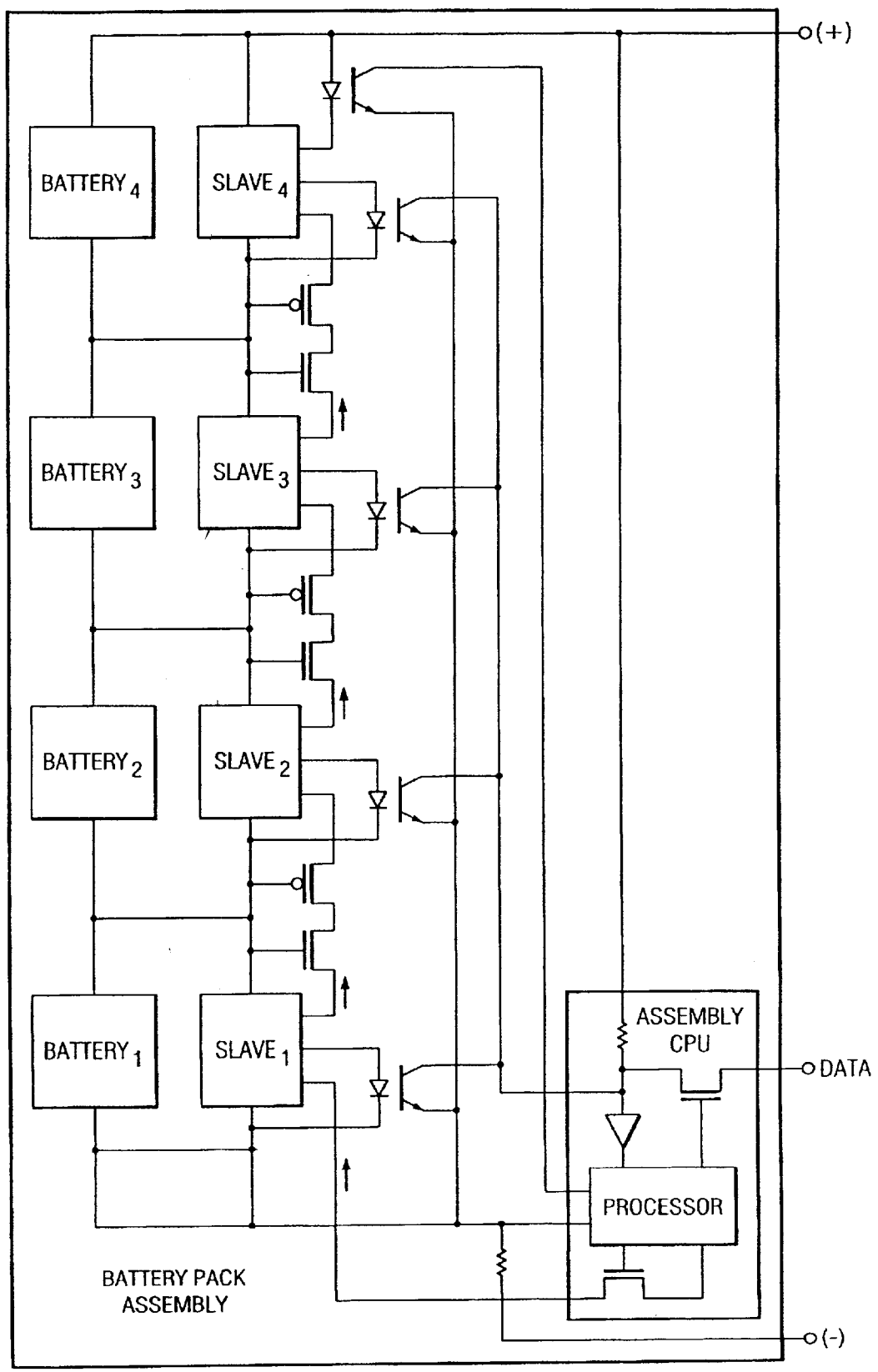
FIG. 8 is a simplified schematic illustrating a battery pack constructed in accordance with the present disclosure and including a plurality of the computer processing units of FIG. 7 connected together in series for sequentially communicating with a host device.

The slave CPU of FIG. 7 is adapted to be connected in series with other slave components for sequential communications with a host device. FIG. 8 shows a battery pack constructed in accordance with the present disclosure and including a plurality of the slave components of FIG. 7 connected together in series for sequentially communicating with a host device. Each of the slave components is connected to a battery. Although not shown, each slave component includes at least one measurement device for measuring a variable property of the battery, and an analog to digital converter for converting an analog signal produced by the measurement device into a digital signal.

As shown, the signal-in and the signal-out lines of the slave CPU's are connected in series. The assembly also includes an assembly CPU having a processor, a one-wire data line for connection to a host component (not shown), an information line arranged to receive the signals from each of the data-out lines of the slave components, and a command line connected to the signal-in line of a first of the connected slave components.

The assembly processor is connected to the assembly data line and includes a first pull-down circuit for varying voltage on the data line to signal a host connected to the data line. The processor is also connected to the command line and includes a second pull-down circuit for varying voltage on the command line. The processor is further connected to the information line.

The processor is programmed to vary voltage on the command line using the second pull-down circuit when the data line is energized to signal the first slave CPU to report information. The assembly processor is also programmed to vary voltage on the data line using the first pull-down circuit when at least one data bit from the slave components is received on the information line to signal information over the data line including identification of the slave component (i.e., first slave, second slave . . . ) and the at least one data bit of the particular slave component (i.e., information about the slave's respective battery).

Thus, when a host energizes the data line of the assembly, the assembly processor pulls down the voltage on the command line to instruct the first slave CPU to signal information regarding the first battery to the assembly CPU over the information line. The assembly processor then signals the battery number and information to the host over the data line utilizing the protocol of FIG. 2.

The second, third and fourth slaves then sequentially report their battery information to the assembly CPU, which in turn sequentially reports the battery identifier and battery information to the host. The signal-out line of the last of the slave CPU's (the fourth slave in the particular embodiment) is also connected to the information line of the assembly processor. When the last slave is finished reporting information to the assembly CPU, the last slave signal the assembly that the last slave has reported in through the signal-out line of the slave and the information line of the assembly CPU. The assembly CPU can then signal the host that all the slaves of the assembly have reported.

The signal-in and the signal-out lines of the slave CPU's are preferably connected through voltage level shifters, and the data-out lines are preferably connected to the information line of the assembly CPU through optoisolators. In addition, the signal-out line of the slave and the information line of the assembly CPU are connected through an optoisolator.

Thus, the present disclosure provides a new and improved communications architecture and protocol that includes connecting a single data wire between a host processor and a slave processor. In this approach, the host processor (which may be in a portable electronic component, such as a cell phone, PDA, or camcorder) contains a switch for coupling a positive voltage to the data line. The slave processor (which may be contained within a battery pact for monitoring the battery) then signals data at a set rate using a predetermined protocol, but in only one direction along the data line.

Accordingly, when the host processor needs information the host energizes the data line and the slave processor is able to send information to the host. When data transmission from the slave processor is completed, or even before the transmission is complete (i.e., at the discretion of the host processor), the host processor can remove the voltage source from the data line, causing the data line to go low. The slave may be programmed to become activated and only send data when the data line is energized, or may continuously send data regardless of the state of the data line.

In a device containing multiple slave processors according to the present disclosure, the interrogation of each slave by the host processor is done sequentially and periodically. In one embodiment (not shown), each slave can include a storage device, such as shift register, which can be continuously updated in real time with desired information for transmittal to the host. Then, when activated by the host, the slave provides the most recently updated information to the host. A further embodiment (not shown) might comprise a system for monitoring multiple batteries with periodic and staggered time delay, or a wired OR logic arrangement to determine which slave is being interrogated. Various arbitration schemes, or logic arrangements can also be used to determine whether another slave is using the single data wire.

Those skilled in the art will recognize that the embodiments described above are merely illustrative. These examples may help to show some of the scope of the inventive concepts, but these examples do not nearly exhaust the full scope of variations in the disclosed novel concepts. Thus, the scope of the innovative concepts described in the present disclosure is not limited except by the appended claims.

What is claimed is:

1. A method of signaling at least one data bit to a host processor from a slave processor over a one-wire data line, comprising:

providing a slave processor incapable of sampling data from the data line;

energizing the data line using a host processor when at least one data bit is desired from the slave processor;

varying the voltage on the energized data line using the slave processor; and sampling the voltage on the energized data line using the host processor to determine the value of a bit signaled by the slave processor.

2. A method according to claim 1, further comprising de-energizing the data line when the desired data bit is signaled by the slave processor.

3. A method according to claim 1, wherein the slave processor varies the voltage on the energized data line only after a pre-selected time period has elapsed.

4. A method according to claim 1, wherein the slave processor pulls the voltage low on the energized data line to signal a "0".

5. A method according to claim 1, wherein the slave processor raises the voltage high on the energized data line to signal a "1".

6. A method according to claim 1, wherein the host processor energizes the data line by raising the data line to a high logic level.

7. A data communication interface for transferring at least one data bit to a host processor, comprising:

a one-wire data line;

a slave processor connected to the data line and including a pull-down circuit for varying voltage on the data line at the request of the slave processor, the slave processor incapable of sampling data from the data line;

wherein the slave processor is programmed to vary voltage on the data line using the pull-down circuit when the data line is energized, to signal at least one data bit.

8. An interface according to claim 7, wherein the slave processor includes a clock and is programmed to vary the voltage on the energized data line only after a pre-selected time period has elapsed.

9. An interface according to claim 7, wherein the slave processor is programmed to pull the voltage low on the energized data line to signal a "0".

10. An interface according to claim 7, wherein the slave processor is programmed to raise the voltage high on the energized data line to signal a "1".

11. An interface according to claim 7, further comprising:
a host processor connected to the data line and including a pull-down circuit for varying voltage on the data line at the request of the host processor, the host processor capable of sampling data from the data line;
wherein the host processor is programmed to energize the data line using the pull-down circuit when at least one data bit is desired from the slave processor, and sample the voltage on the energized data line to determine the value of a bit signaled by the slave processor.

12. An interface according to claim 11, wherein the host processor energizes the data line by raising the data line to a high logic level.

13. An interface according to claim 7, further comprising:
a battery;
at least one measurement device for measuring a variable property of the battery and for producing an analog signal indicative of the measurement; and
an analog to digital converter connected to the measurement device for converting the analog signal indicative of the measurement to at least one data bit;
wherein the slave processor is connected to the analog to digital converter and includes memory for receiving the at least one data bit from the converter and storing the at least one data bit until the data line is energized.

14. A system for transferring at least one data bit from a slave device to a host device, said system comprising:
a signal-in line;
a data-out line;
a signal-out line; and
a processor including a pull-down circuit for varying voltage on the signal-out line, the processor connected to the signal-in line and the data-out line;
wherein the processor is programmed to transfer at least one data bit over the data-out line when voltage of the signal-in line is varied, and to vary the voltage on the signal-out line after transferring the at least one data bit over the data-out line;
at least one measurement device for measuring a variable property of a battery and for producing an analog signal indicative of the measurement; and
an analog to digital converter connected to the measurement device for converting the analog signal indicative of the measurement to at least one data bit;
wherein the processor is connected to the converter and includes memory for receiving the at least one data bit from the converter and storing the at least one data bit until the voltage on the signal-in line is varied.

15. The system according to claim 14, further comprising a removable battery pack.

16. The system according to claim 14, wherein the slave device comprises a plurality of components connected in series through the signal-in and the signal-out lines, and further includes an interface of the slave device comprising:
a one-wire data line for connection to the host component device;
an information line arranged to receive the at least one data bit from each of the data-out lines of the plurality of components;
a command line connected to the signal-in line of a first of the plurality of components;
wherein the processor is connected to the data line and includes a first pull-down circuit for varying voltage on the data line, the processor is incapable of sampling data from the data line, the processor is connected to the information line, and connected to the command line and includes a second pull-down circuit for varying voltage on the command line;
wherein the processor is programmed to,
vary voltage on the command line using the second pull-down circuit when the data line is energized, and
vary voltage on the data line using the first pull-down circuit when at least one data bit from one of the slave components is received on the information line to signal information over the data line including identification of the slave component and the at least one data bit of the particular slave component.

17. The system according to claim 16 wherein the plurality of components are connected in series through voltage level shifters.

18. The system according to claim 16 wherein the data-out lines of the plurality of components are connected to the information line of the processor by optoisolators.

19. The system according to claim 16 wherein the signal-out line of a last of the plurality of components is connected to the information line of the processor.

* * * * *